United States Patent
Umeno et al.

[15] 3,638,230
[45] Jan. 25, 1972

[54] APPARATUS FOR MEASURING DYNAMIC LOSS ANGLE

[72] Inventors: Masashi Umeno, Kawasaki; Shiro Yabuta, Yokohama; Takashi Nishida, Tokyo, all of Japan

[73] Assignee: Japan Synthetic Rubber Co., Ltd., Tokyo, Japan

[22] Filed: June 24, 1970

[21] Appl. No.: 49,486

[30] Foreign Application Priority Data

June 27, 1969 Japan.................................44/50366

[52] U.S. Cl. .................................346/33 R, 73/15.6, 73/89
[51] Int. Cl. .........................................................G01n 25/02
[58] Field of Search......................73/15.6, 67.1, 101, 59, 60, 73/99, 89; 346/33 R, 74 E

[56] References Cited

UNITED STATES PATENTS

| | | | |
|---|---|---|---|
| 3,132,509 | 5/1964 | Hayashi | 73/67.1 |
| 3,256,741 | 6/1966 | Wise | 73/89 X |
| 3,550,427 | 12/1970 | Sueyoshi | 73/15.6 |

*Primary Examiner*—Joseph W. Hartary
*Attorney*—Sherman and Shalloway

[57] ABSTRACT

The dynamic loss angle of rubber or plastic materials is measured with simplicity by using a vibration-type cure meter such as curelastometer, wherein the moment the deformation of a specimen of the rubber or plastic materials is ±0 and the moment the torque of the specimen is ±0, electric current is caused to flow in an event marker moving against the peripheral surface of a rotary drum adapted to rotate in synchronous relation with the vibration of the tester, whereby pulses are recorded on the rotary drum.

2 Claims, 5 Drawing Figures

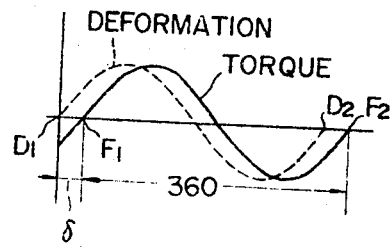
Fig. 1
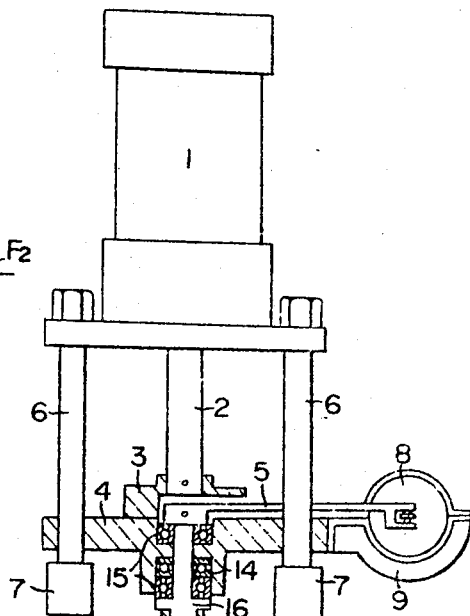
Fig. 2
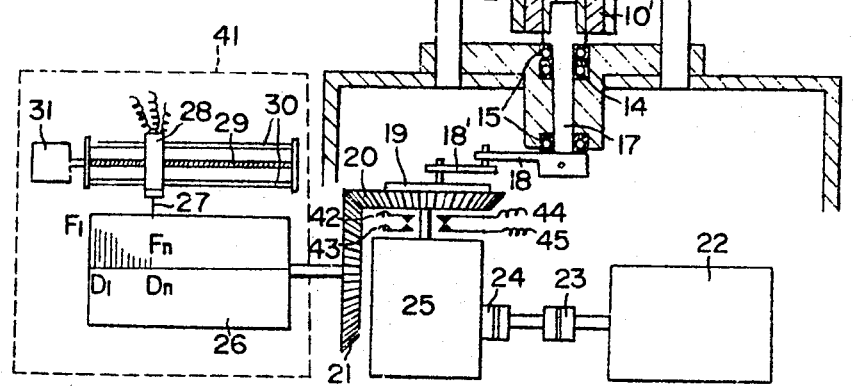

APPARATUS FOR MEASURING DYNAMIC LOSS ANGLE

This invention relates to an apparatus for measuring a dynamic loss angle of rubber or plastics.

Repeated deformation of rubber or plastics with a certain amplitude causes a corresponding torque. The deformed condition of a test sample and the condition of occurrence of torque therein can be measured simultaneously as shown by the deformation-time curve and torque-time curve. Experiments show that these two curves do not correspond with each other in many cases. The deviation differs according to the types of plastics or rubber and the degree of cross-linkage. For instance, in a given number of vibrations, deformation precedes, and torque follows with some time lag. But if the number of vibrations varies considerably, the relation will sometimes be reversed. The dynamic loss angle is the aforementioned deviation expressed in terms of an angle. One cycle of a certain given amplitude in a repeated test is expressed as 360°. In the light of this standard, a lag of stress against deformation is expressed in degree of an angle. The angles are termed dynamic loss angles.

The dynamic loss angles are utilized in determining the quality of various articles. For instance, in the use of rubber or plastics, the dynamic fatigue or dynamic heat buildup of these articles are closely related to their dynamic loss angles. Based on this relation, it is possible to determine the quality of the article from its dynamic loss angle to some extent. Because of this utilization, various measuring methods have been devised and used heretofore. For instance, there is a method of measuring a time lag of reflecting light from one light spot by mounting a reflecting mirror to a drive shaft and a driven shaft. There is another method in which a differential transformer is fitted to a drive shaft and a strain gauge, to a driven shaft, and the measuring is made by utilizing an electrical subtraction of electrical signals detected from both of them. The former is used at a frequency of 10–50 c.p.s. (cycles/second), and the latter, at a frequency of 3.5–110 c.p.s. One method which comes within the category of the latter method is capable of measuring changes in the dynamic loss angle in the process of cross-linkage of rubber or plastics.

According to the invention, an attachment is fitted to a vibration-type cure meter such as a curelastometer and the dynamic loss angle in the process of cross-linkage of rubber or plastics by heat can be measured with far simpler operation than the conventional methods. An object of the invention is to measure the dynamic loss angle with simplicity in a curelastometer by flowing electric current through the event marker the moment the deformation value of the test piece is ±0 and the torque value on the torque recording device is ±0, and recording the pulses on a rotary drum.

The present invention will be further described with reference to the accompanying drawings in which:

FIG. 1 illustrates the results of measurement by means of a curelastometer and gives an example of deformation time curve and stress-time curve;

FIG. 2 is a side elevation in vertical section showing a part of the apparatus in accordance with the present invention;

Figure 4:
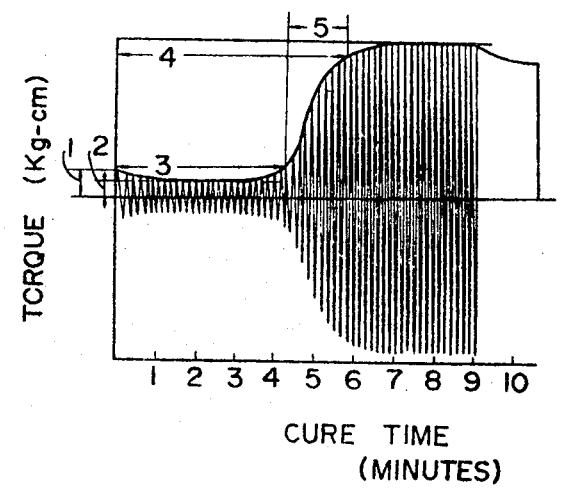

FIG. 4 illustrated the vulcanization time-torque curve of rubber; and

Figure 5:
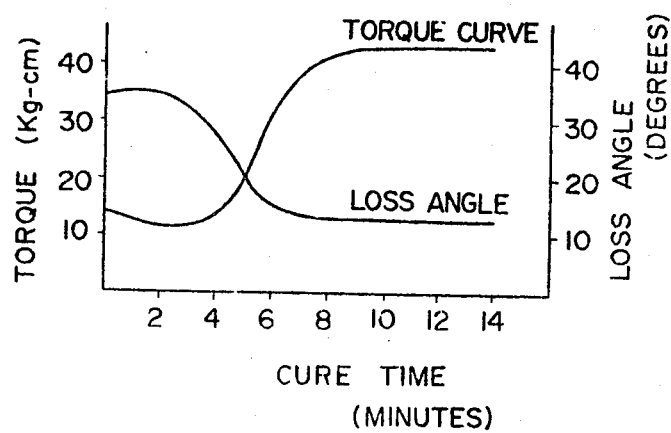

FIG. 5 shows the torque curve and the loss angle curve on one paper.

As described previously, a vibration-type tester such as a curelastometer is utilized in the present invention. A tester of this kind is described in the applicants' U.S. Pat. No. 3,479,858. As shown in FIG. 2, an attachment shown in the left side of the figure is fitted to a curelastometer shown on the right side.

First of all, the operation of the curelastometer will be described.

Referring to FIG. 2, dices 11 and 12 are fixed respectively to the ends of an upper shaft 16 and a lower shaft 17, both shafts being freely rotatable. A gap exists between the facing dices 11 and 12, and this space is used as a specimen chamber 13. Unvulcanized compounded rubber is filled in the specimen chamber 13, and the lower dice 12 is caused to vibrate in a given pressed condition; whereupon force is transmitted to the upper dice 11 through the rubber. For detecting its torque, an arm 5 is secured to the upper end of the upper shaft 16, and to the other end of the arm 5 is held a load cell 8. The dices 11 and 12 contain heaters 10 and 10' respectively. A drive arm 18 is secured to the lower end of a shaft 17 as means for vibrating the lower dice 12 and the lower shaft 17. An eccentric device 19 is connected to the other end of the drive arm 18 via a connecting rod 18'. The eccentric device 19 is adapted to vibrate by the rotation of a motor 22 6 times per minute (variable from 3–600 times) usually through ±3° (variable from 0–15°).

When pneumatic pressure within a pneumatic chamber 1 is transmitted to the upper dice 11 through a shaft 2 and a frame 4, and a vibration of a predetermined amplitude is imparted to the lower dice 12 in a state where a suitable pressure is given to the specimen, the vibration of the lower dice causes the rotation of the upper dice via the rubber specimen in contact therewith. This torque is detected by means of the load cell 8, and recorded by the recording apparatus. For instance, the result of recording with a recording device 32 shown in FIG. 3 at a recording paper feed rate of 1 cm. per minute is shown in FIG. 4 in which the axis of abscissa represents cure time in minutes and the axis of ordinates, the torque in kg.-cm. It will be seen that the torque varies according to the cure time. Various states of the torque can be judged from a curve obtained by connecting the outer edge portion of a figure which is drawn with a recording pen moving through 6 cycles per minute.

Figure 3:
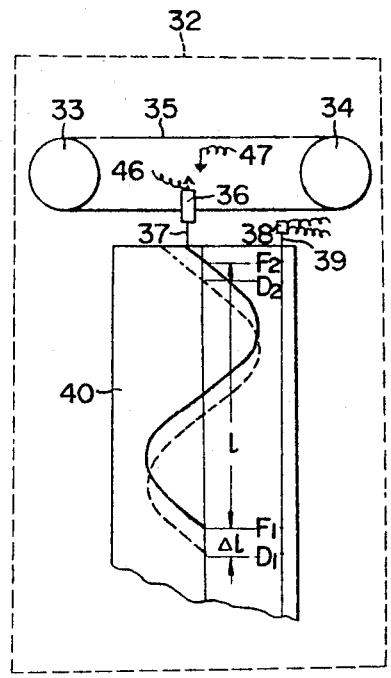
FIG. 3 illustrates a recording device.

Referring to FIG. 4, reference numeral 1 represents an initial viscosity of unvulcanized compounded rubber, 2, the minimum viscosity of the rubber during vulcanization, 3, an induction time (scorch time), 4 an optimum cure time, and 5, a cure rate. These factors can be derived from the curve obtained above. When the feed rate of recording paper is made considerably larger than the above-given example, for instance, 60 cm. per minute, the torque-time curve recorded by the recording device 32 is a sine curve as illustrated in FIGS. 1 and 3. The deformation-time curve recorded at this time is a sine curve as shown by a dotted line in FIGS. 1 and 3. There is certainly a deviation in phase between the solid line curve and the dotted line curve. The deformation precedes, and the torque follows with some lag (although depending upon the conditions, this relation may be reversed). The deviation fluctuates depending upon the types and cross-linking degrees of the specimens.

The curelastometer described in the foregoing is known, and not new at all. The present invention is based on such curelastometer, and relates to an improvement over it. Referring to FIGS. 1 and 3, the dynamic loss angle ($\delta$) is expressed by the following equation:

$$\delta = 360°(\Delta l/l)$$

To obtain the values $\Delta l$ and $l$, it is necessary to know $D_1$, $D_2$, $D_3$...showing positions when the deformation is ±0, and $F_1$, $F_2$, $F_3$...showing positions when the torque is ±0. There is no need to know the states of the curve other than the above. In order to record the aforementioned ($D_1$, $F_1$), ($D_2$, $F_2$)...contacts 44 and 45 are provided in the eccentric device illustrated in FIG. 2 so that a microswitch is on at the moment when the deformation is ±0 (D system). Then, circuits 46 and 47 are provided which are connected at the moment when the torque recorded by the recording device 32 is ±0. These two circuits are connected to an event marker 38. With such construction, the event marker 38 records the pulses of $D_1F_1$, $D_2F_2$ on recording paper 40. Since the length $F_1$-$F_2$ corresponds to $l$ and the length $D_1$-$F_1$, to $\Delta l$, the dynamic loss angle equation can be rewritten as follows:

$$\delta = 360°(\Delta l/l) = 360°(D_1F_1/F_1F_2)$$

According to the above-mentioned method, a very long recording paper is used, and there is much waste. To remove this defect, the device illustrated on the left side of FIG. 2 is provided in the present invention. A bevel gear 20 for the eccentric device is in mesh with a bevel gear 21 of the same diameter provided at right angles to the bevel gear 20 so as to rotate a rotary drum 26 during the testing on the curelastometer. Recording paper is wound around the rotary drum, and a recording pen 27 is brought in contact with the recording paper. The recording pen 27 is secured to an event marker 28 which is moved by a motor 31 at a predetermined rate, for instance 1 centimeter per minute in the axial direction of the drum 26. In such a case, the recording pen 27 draws fine helical lines on the recording paper wound onto the drum 26. With the deformation ±0 (D system) in mind, the recording points of the D system start from one point on the surface of the drum 26, i.e., $D_1$; the next point $D_2$ is parallel with the axial line of the drum 26 and on the straight line which passes point $D_1$ along the surface of the drum 26. $D_3$ and subsequent points are all on this straight line. The recording points of F system occupy the positions corresponding to the respective points of the D system. If recording paper is calibrated in degrees of an angle so that a length of the recording paper which turns around the drum one is 360°, the readings of the points of the F system directly indicate those of the dynamic loss angles ($\delta$). The loss angle-time curve is obtained by connecting the points F.

In the above description, it has been assumed that the diameters of the two bevel gears are the same, namely the number of rotations of the bevel gear 20 is the same as that of the drum 26. The rotation of the drum 26 can be made faster by reducing the diameter of the bevel gear 21. If the rotation of the drum 26 is made twice as fast as the bevel gear 20, one division of the recording paper on the drum 26 corresponds to an angle of 0.5°, thus increasing the accuracy of angle measurement.

In the above-mentioned method, the points in the D and F systems are expressed in points, but there is a method in which the D points and F points are connected with a solid line, as shown for instance in the drum 26 in FIG. 2. In order to effect this method, the points of the D system are recorded on recording paper on the drum 26 when the contacts 44 and 45 are connected at the moment of deformation ±0, the contact between the pen 27 and the recording paper is maintained, and the pen 27 is detached from the recording paper at the same time as the connection of contacts 46 and 47 at the moment of the torque ±0. Thus, the recording is in the form of continuous line appearing every time the drum 26 rotates once. The points of the D system are positioned on a straight line on the surface of the drum 26.

As shown in FIG. 5, if the torque curve and the loss angle curve are simultaneously expressed, it is possible to know detailed information about the optimum cure of rubber or plastic materials. This can be readily produced by overlaying the torque-time curve illustrated in FIG. 4 and the loss angle-time obtained in the drum 26 as illustrated in FIG. 2.

While the invention has been described with particular reference to a curelastometer, it is to be understood that the invention is applicable with equal results to other vibration-type cure meters, such a rheometers and viscurometers. Mounting the recording device of the present invention onto such testers leads to a simple measurement of dynamic loss angles of rubber or plastic materials.

What we claimed is:

1. For use with a mechanism imparting a periodic torsion to a rubber or plastic material and means for measuring the deformation and torque of the rubber or plastic material, apparatus for measuring the dynamic loss angle of the rubber or plastic material comprising a drum having an outer peripheral marking surface;
drive means for rotating said drum in synchronous relation with the periodic torsion imparting mechanism;
event marking means contacting said marking surface;
means for moving said event marking means to provide a helical trace on said marking surface; and
means responsive to the deformation and torque measuring means to supply electricity to said event marking means when the deformation is ±0 and when the torque is ±0, said event marking means being responsive to said electricity to record the positions of ±0 torque by pulses whereby the dynamic loss angle is recorded by pulses and can be determined by the distance therebetween.

2. For use with a mechanism imparting a periodic torsion to a rubber or plastic material and means for measuring the deformation and torque of the rubber or plastic material, apparatus for measuring the dynamic loss angle of the rubber or plastic material comprising a drum having an outer peripheral marking surface;
drive means for rotating said drum in synchronous relation with the periodic torsion imparting mechanism;
a recording pen movable to contact said marking surface;
means for moving said recording pen to selectively contact said marking surface; and
means responsive to the deformation and torque measuring means to control said recording pen moving means to move said recording pen into contact with said marking surface when the deformation is ±0 and to move said recording pen out of contact with said marking surface when the torque is ±0 such that said recording pen is continuously in contact with said marking surface between ±0 deformation and ±0 torque whereby the dynamic loss angle is recorded in the form of a line and can be determined thereby.

* * * * *